Figure 4:
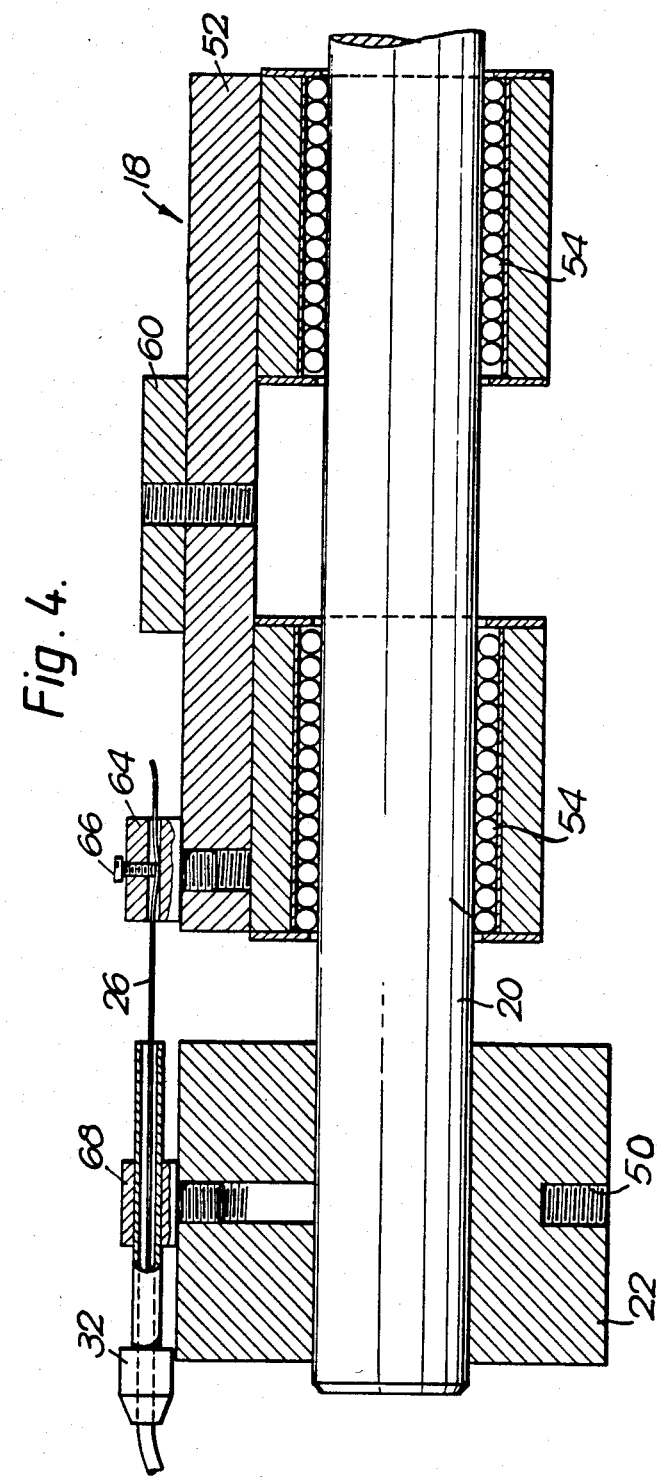

United States Patent [19]

Ealovega et al.

[11] Patent Number: 4,498,744
[45] Date of Patent: Feb. 12, 1985

[54] METHOD OF AND APPARATUS FOR PRODUCING A PHOTOGRAPH OF A MOBILE SUBJECT

[76] Inventors: George D. Ealovega, Marley Lodge, Marley Heights, Haslemere, Surrey GU27 3LU; Peter J. Langridge, 31 Southlands Close, Ash, Aldershot, Hants, both of England

[21] Appl. No.: 401,973

[22] Filed: Jul. 26, 1982

[30] Foreign Application Priority Data

Jul. 28, 1981 [GB] United Kingdom ............... 8123179

[51] Int. Cl.³ ............................................. A63J 5/00
[52] U.S. Cl. ....................................... 352/89; 352/39; 352/132; 352/243
[58] Field of Search ................. 352/39, 89, 132, 38, 352/243, 84, 85; 354/293

[56] References Cited

U.S. PATENT DOCUMENTS 2,822,720  2/1958  Douglas .............................. 352/85

FOREIGN PATENT DOCUMENTS 504935  5/1939  United Kingdom .

Primary Examiner—Monroe H. Hayes
Attorney, Agent, or Firm—Fulwider, Patton, Rieber, Lee & Utecht

[57] ABSTRACT

There is disclosed a method of producing a photograph of a mobile subject such as a vehicle, in which method a camera is mounted for linear translational movement along a support in a direction parallel with the path of movement of the subject. A motion transmitting operative connection is established between the subject and the camera such that for a linear translational displacement of the subject in said direction there will be a corresponding linear translational displacement of the camera in said direction along said support. The motion transmitting connection may comprise a mechanical connection e.g. via Bowden cable, or an electrical or electronic servo arrangement. To produce a photograph, the subject is displaced linearly in said one direction while making a photographic exposure in the camera, so that the period of the exposure lies within the period of corresponding movement of the camera along said support.

2 Claims, 9 Drawing Figures

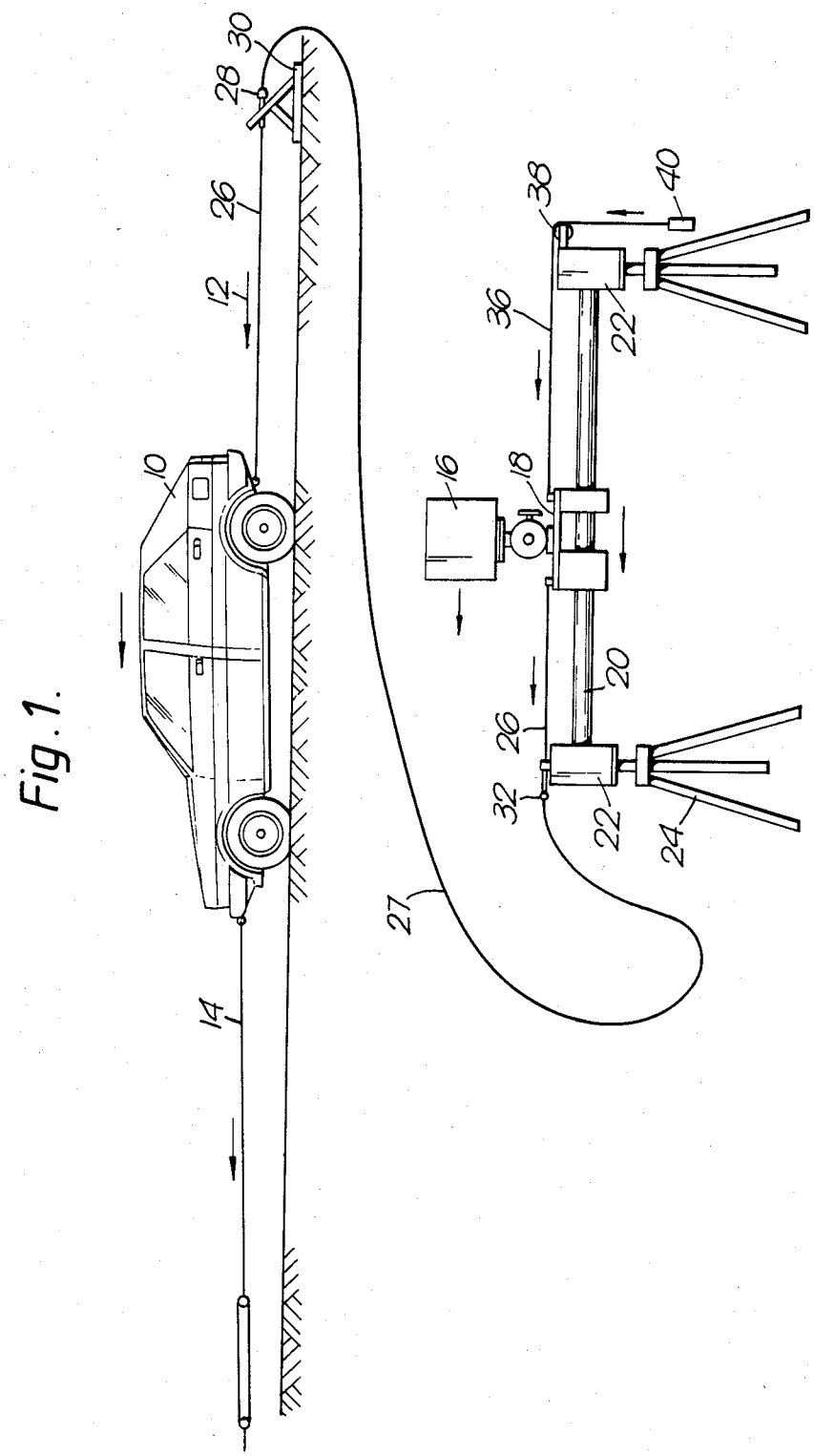

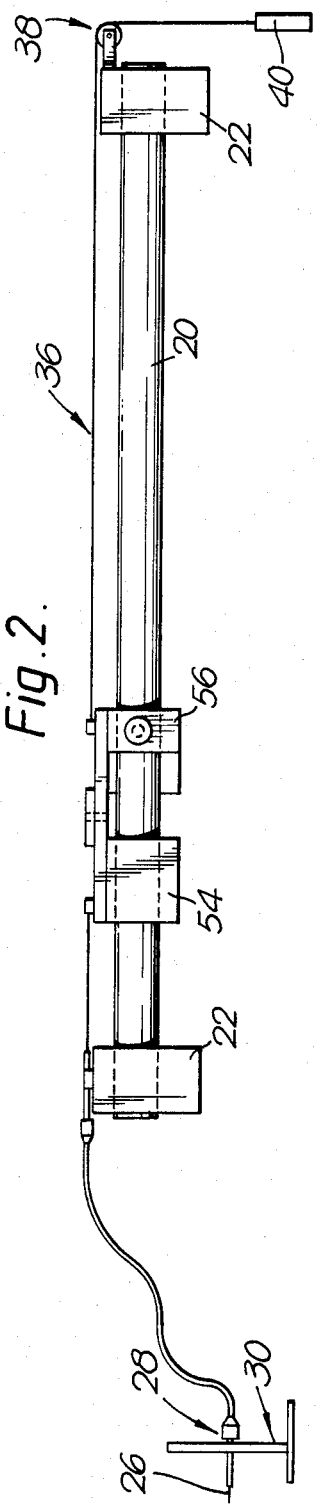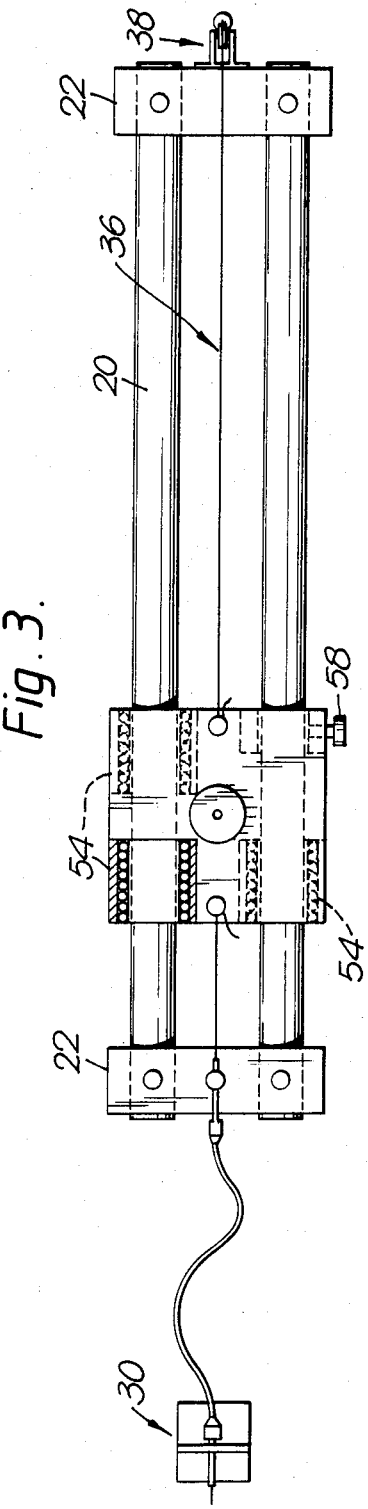

6,498,744

METHOD OF AND APPARATUS FOR PRODUCING A PHOTOGRAPH OF A MOBILE SUBJECT

This invention relates to a method of producing a photograph of a mobile subject such as a vehicle and to apparatus for performing the method.

It is frequently desirable, particularly in photographic work intended for advertising literature for motor cars and the like vehicles, to produce a photograph of such a vehicle which shows a sharp image of the vehicle and at the same conveys the impression of rapid motion of the vehicle.

Various techniques have been tried to secure this end. One such technique consists in photographing the vehicle whilst the latter is stationary but occupied by photographic models as passengers and disposed on a road surface, and relying upon the attitude of the models and the disposition of the vehicle on the road to convey the impression of motion. Whilst this technique, of course, presents no difficulty in rendering the detail of various parts of the vehicle sharp in the photograph, the impression of motion is less convincingly conveyed, inter alia because the background tends to be fairly sharp as are the wheels and tyres of the vehicle. It is possible to retouch the wheels and background detail in the photograph obtained by this technique in order to simulate motion. Unfortunately, such retouching is expensive and is nevertheless invariably detectable. Another technique which may be adopted is to photograph the vehicle whilst the latter is actually in motion and to "pan" the camera with the vehicle whilst making the photographic exposure. However, whilst such a technique can afford a very effective impression of motion at speed, it has the disadvantage that, even when perfectly executed, (with the possible exception of a photograph taken from a distance) this technique also produces a photographic image in which some portions of the vehicle are not rendered sufficiently sharply, because, even when the "panning" action is carried out perfectly, the angle of view of the vehicle is constantly changing during the exposure.

Another technique which may be adopted is to photograph the subject vehicle from another vehicle moving adjacent the subject vehicle and at a matched speed. Unfortunately, unpredictable upward and downward movement of both vehicles, due, for example, to bumps in the road, is unavoidable in practice, making it necessary to use high shutter speeds, with consequent reduction of the desired background streaking effect, or to accept some loss of quality in the resulting photograph. Furthermore this technique affords a limited choice of angle of view of the subject, (limited, inter alia, by the width of the road) and only very general control of the background to the photograph at the time of exposure is possible.

Those of the above techniques which involve photographing moving vehicles have the further disadvantage that they can only be carried out conveniently using small format cameras, e.g. 35 mm or 2½" which allow continuous alteration of focus etc. and which can be conveniently hand held during exposure. The quality of photographic enlargements from negatives exposed in such cameras is unfortunately poor as compared, for example, with the results obtainable utilising the 8×10 inch format.

It is an object of the present invention to provide a method of producing a photograph of a mobile subject, by which method at least some of the above noted disadvantages may be avoided.

According to one aspect of the invention there is provided a method of producing a photograph of a mobile subject such as a vehicle comprising providing a camera mounted for linear translational movement along a support in a predetermined direction, establishing a motion transmitting operative connection between the subject and the camera such that for a linear translational displacement of the subject in said one direction there will be a corresponding linear translational displacement of the camera in said one direction along said support, the method further comprising displacing the subject linearly in said one direction while making a photographic exposure in the camera, so that the period of the exposure lies within the period of corresponding movement of the camera along said support.

According to another aspect of the invention there is provided apparatus for use in producing a photograph of a mobile subject such as a vehicle, comprising a camera mounted for linear translational movement along a support in a predetermined direction, means for detecting linear displacement of a subject in said predetermined direction, and means for imparting linear displacement in said predetermined direction along said support to said camera in correspondence with a sensed displacement in said predetermined direction of the subject, the camera being operable to make a photographic exposure during, and extending over an appreciable part of, said exposure.

Figure 5:
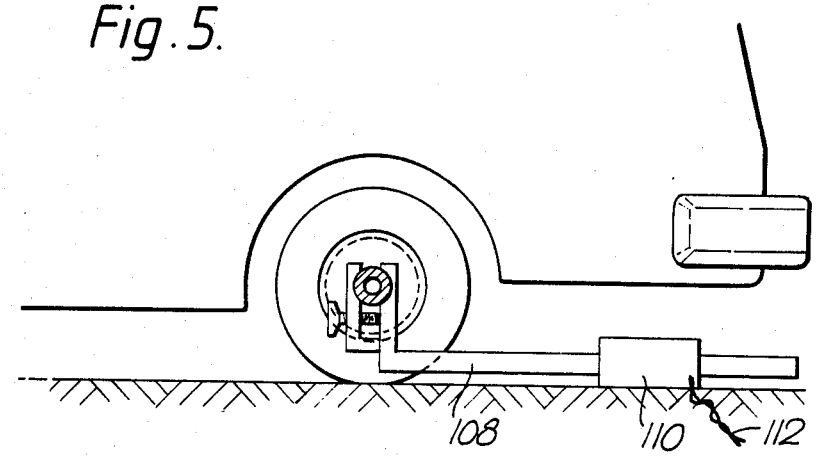
Figure 6:
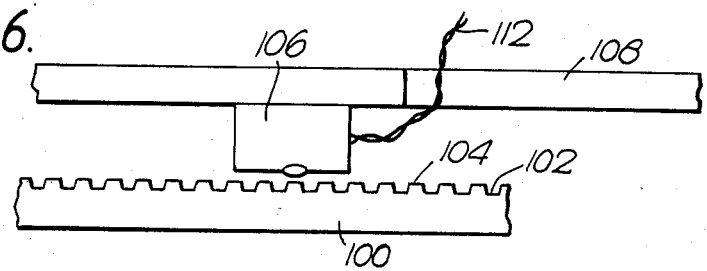
Figure 7:
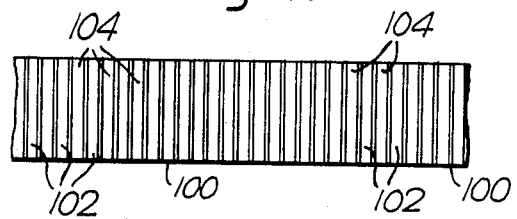
Figure 8:
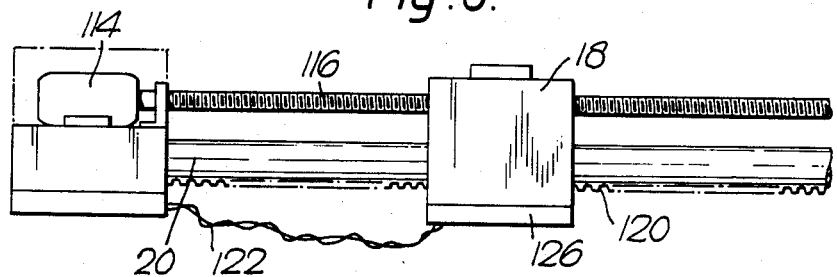

An embodiment of the invention is described below with reference to the accompanying drawings in which:

FIG. 1 is a diagrammatic perspective view illustrating one mode of carrying out the method according to the invention, FIG. 2 is a side elevational view of apparatus embodying the invention, FIG. 3 is a plan view of the apparatus of FIG. 2, FIG. 4 is a view, partly in section and to a larger scale, of part of the apparatus of FIGS. 2 and 3, FIG. 5 is a schematic side elevation view, partly in section illustrating the use of a variant apparatus embodying the invention, FIG. 6 is a schematic side elevation view of another part of this variant apparatus, FIG. 7 is a schematic plan view of an optically reflective grid forming part of the apparatus of FIGS. 5 and 6, FIG. 8 is a fragmentary side elevation view of another part of the apparatus of FIGS. 5 to 7, and FIG. 9 is a schematic block diagram of electronic control circuitry incorporated in the apparatus of FIGS. 5 to 8.

Referring first to FIG. 1, a vehicle 10 to be photographed is arranged to be drawn forwards along a predetermined path in a direction indicated by the arrow 12 by means of a towing cable 14. A camera 16 is mounted on a camera mount 18 which is in turn mounted for linear sliding movement along support bars 20 which extend, parallel with the predetermined path of motion of the vehicle 10, between supporting blocks 22 supported from the ground by respective tripods 24.

The camera mount 18 is mechanically connected with the vehicle 10 by means of the inner cable 26 of a Bowden cable arrangement 27 which includes, in a manner known per se, a tubular outer or sheath which is substantially incompressible longitudinally and incorporates a helically coiled wire, through which outer sheath passes the inner cable 26. One end of the outer sheath is engaged in a cable stop 28 held in a stand 30 disposed to the rear of the vehicle, in alignment with its path of motion, while the other end of the cable outer is engaged in a cable stop 32 secured to one of the blocks 22. The inner cable 26 extends from the stop 28 to the rear of the vehicle to which it is attached, whilst the other end of the inner cable 26 extends from the cable stop 32 to the camera mount 18 to which it is also attached. As illustrated in FIG. 1 the arrangement is such that as the vehicle 10 moves in direction 12 along its predetermined path, so the camera mount 18 and thus the camera 16 move at precisely the same speed along the parallel bars 20, the camera 16 moving in the same direction as the vehicle 10. The assembly comprising the camera 16, camera mount 18, bars 20, blocks 22 and tripods 24 is disposed at a desired distance transversely of the path of movement of the vehicle, the arrangement being selected to secure the desired angle of view of the vehicle relative to the camera.

In order to keep the cable 26 appropriately tensioned, a further cable 36 is extended from the mount 18 to a pulley 38 mounted on the block 22 remote from that which carries the cable stop 32, the cable 36 passing over the pulley 38 and carrying, at its free end, a counter weight 40.

In the preferred method embodying the invention, the vehicle 10 is slowly pulled, e.g. by man power, a winch, or another vehicle, along its predetermined path over a distance no greater than the length of the bars 20, during which time the photographic exposure is made. Because the vehicle 10 and camera 16 move at precisely the same rate along substantially parallel paths, there is no alteration in relative angle between the vehicle 10 and the camera 16, so that all of the detail of the vehicle 10, with the exception of the wheels, may be rendered sharply in the resulting photograph. The blurring or streaking, due to the motion of the camera, of the background of the photograph, and the extent of wheel and tyre blur due to the motion of the wheels relative to the body of the car is entirely determined by the displacement of the vehicle and the camera during the period of the exposure and can thus be controlled by conrolling the exposure time. Thus, because the camera and the vehicle move simultaneously during the exposure, the vehicle remains sharply in focus on the film, while the background and the wheels are blurred or streaked, giving the impression, in the photograph, of motion of the vehicle at speed.

Further to the advantages already noted, the technique described above with reference to the drawings has the advantage of offering greater choice of photographic location, as because the vehicle need only be moved, on average, up to 36 inches during a photographic "shot" it is unnecessary to place the vehicle on a real road. It is thus possible to control completely the angle of view of the subject and the distance of the camera from the subject. No major retouching of the photograph obtained is necessary, and it is relatively simple to carry out the minor retouching necessary to render invisible the cables 14 and 26.

Because the distance between the camera and the subject vehicle 10 is predetermined and does not vary during the exposure, and because the camera is reliably and stably supported by the mount 18 and bars 20, the use of a large format pre-focus camera is possible, with the consequent advantages in photographic quality.

It is, of course, necessary to take some precautions to obtain high quality results. Thus, it is desirable to ensure that the bars 20 lie exactly parallel with the path of movement of the subject vehicle, and the surface upon which the subject vehicle will travel during exposure must be chosen with care, as irregularities which will cause movement of the subject vehicle transversely to its predetermined path of movement will be reflected in loss of sharpness of the final photograph. It is of course necessary to ensure that the stand comprising the bar 20, blocks 22, tripods 24 etc. will remain steady and quite stationary during exposure.

The structure of the apparatus in its preferred form will now be described in greater detail.

Referring to FIGS. 2 to 4 the bars 20 are preferably precision ground, hardened, round steel bars of substantial diameter, for example 1.5 inch in diameter, the bars fitting accurately within corresponding bores formed through the blocks 22, which are preferably rectangular blocks of solid aluminium, the bars being secured in the blocks by some convenient means such as screws or pins.

As shown in FIG. 4, each block 22 is formed, in its underface, with a screw threaded bore 50 to receive a standard ⅜ inch camera mount screw on a standard photographic tripod 24. The camera mount 18 comprises a horizontal rectangular metal bed plate 52 to the underside of which are secured three linear bearings 54, two of which are disposed in longitudinally spaced apart relationship around one of the bars 20 and the other of which is disposed around the other bar 20, the three linear bearings 54 being disposed at respective ones of three of the four corners of the bed plate 52. Disposed at the remaining corner of the bed plate 52, on the underside of the latter, is a block 56 through which the respective bar 20 extends slidably. A locking knob 58 has a screw threaded stem threadedly engaged in a screw threaded radial bore formed through the block 56, so that the screw 58 can be screwed up to grip the bar 20 passing through the block 56 or unscrewed to release the same, whereby the camera mount may be locked in position on the bars or freed for movement therealong. The bed plate 52 carries, on its upper side, in its centre, a further plate 60 secured to the plate 52 and forming a platform upon the plate 52. A vertical bore is formed through the plates 60 and 52 to accept a standard ⅜ inch camera mount screw, whereby a camera or camera mounting head for a camera can be secured to the camera mount. The end of the cable 26 is passed through a horizontal bore through a block 64 which is screwed into a screw threaded aperture in the plate 52, the cable 26 being clamped in the bore in block 64 by means of a set screw 66 passing vertically from above into a vertical screw-threaded bore intersecting the horizontal bore in the block 64 which receives the cable 26. The cable stop 32 is likewise supported in a block 68 screwed into a screw threaded bore extending from the upper face of the respective block 22.

The linear bearings 54 are of a type know per se and support the camera mount for smooth longitudinal movement along the bars 20 without permitting transverse movement.

In a variant of the apparatus illustrated schematically in FIGS. 5 to 9, the mechanical link, via the Bowden cable 27, between the subject vehicle and the camera mount 18 is replaced by an electrical/electronic link.

Thus, in this variant, movement of the subject vehicle relative to the ground is sensed by a species of displacement transducer, and corresponding electrical signals are relayed to a mechanism, associated with the apparatus comprising the camera mount 18, support bars 20, and supporting blocks 22, for displacing the mount 18 along the bars 20, to a corresponding extent.

The displacement transducer associated with the subject vehicle may comprise, as illustrated in FIG. 6, an optically reflective grid 100 comprising an elongate member having a planar reflective surface, (for example a polished metal surface), across which are formed transversely, at regular intervals, strips 102 of low reflectivity, for example produced by an etching technique, to define, between adjoining low reflectivity strips 102, high reflectivity strips 104. An electro-optical sensor 106, indicated schematically in FIG. 6 is mounted for movement along the grid 100. The sensor 106 may, for example, be secured to a bar 108 extending parallel with the grid 100 and guided for longitudinal sliding movement in a support or container 110 in which the grid 100 is fixedly mounted, the sensor 106 incorporating, for example, an optical system arranged to focus an image of the grid onto a photo-cell, photo-diode, photo-transistor or the like light sensitive electronic device, so that longitudinal displacement of the sensor 106 relative to the grid 100 produces, as the sensor passes the strips 102 and 104 in succession, a series of corresponding electrical pulses which, for example after appropriate amplification, are output on an electrical lead 112. It will be appreciated by those in the art that many variations on this arrangement are possible; for example, the grid could be an optically transmissive grid, rather than reflective and the grid itself could be slidably mounted in the support 110 with the sensor 106 being fixed therein.

The movable element of the subject displacement transducer, in the example illustrated, the bar 108, is connected, preferably rigidly, with the subject vehicle, with the support or casing 110 being fixed to the ground, for example simply by the effect of friction and its own weight, or by anchoring pegs (not shown) or the like.

In FIG. 5, the bar 108 is shown as being fixed at one end, by means of a clamp arrangement, to the vehicle axle, but this is simply by way of illustration, and in practice it may be preferred to arrange for the transducer to be connected with the vehicle in some other way, for example by means of clips or magnetic members to the vehicle bodywork. It may even be preferred, in certain circumstances to connect the displacement transducer with the vehicle by means of a filament or wire kept taut by spring means or a counter-weight acting between the displaceable element in the transducer and the support or container although it is desirable, in order to avoid inaccuracies arising from stretch in the filament or wire, or backlash in the associated linkage etc. to keep such a flexible wire or filament short.

In any case, of course, the displacement transducer and associated parts are so arranged as to be "out of camera" for example on the side of the subject vehicle remote from the camera.

In this variant, as illustrated schematically in FIG. 8, the camera mount 18 is movable along the bars 20 by means of an electric motor 114, mechanically connected with the mount 18, for example, as shown in FIG. 8, being mounted on one of the blocks 22 and arranged to rotate a lead screw 116, extending between the blocks parallel with the bars 20 and engaging in a nut, (not shown) fixed with respect to the mount 18, with the lead screw 116 being mounted for rotation in, but restrained against longitudinal movement relative to, the blocks.

The mount 18 also has a displacement transducer associated therewith, identical with that associated with the subject vehicle, and comprising, for example, a grid provided by a bar 120 mounted parallel with and between the bars 20 and a sensor 126, indicated schematically, carried by mount 18 and electrically connected, e.g. by a cable 122 with the remainder of control circuitry, described below, associated with the motor 114.

Figure 9:
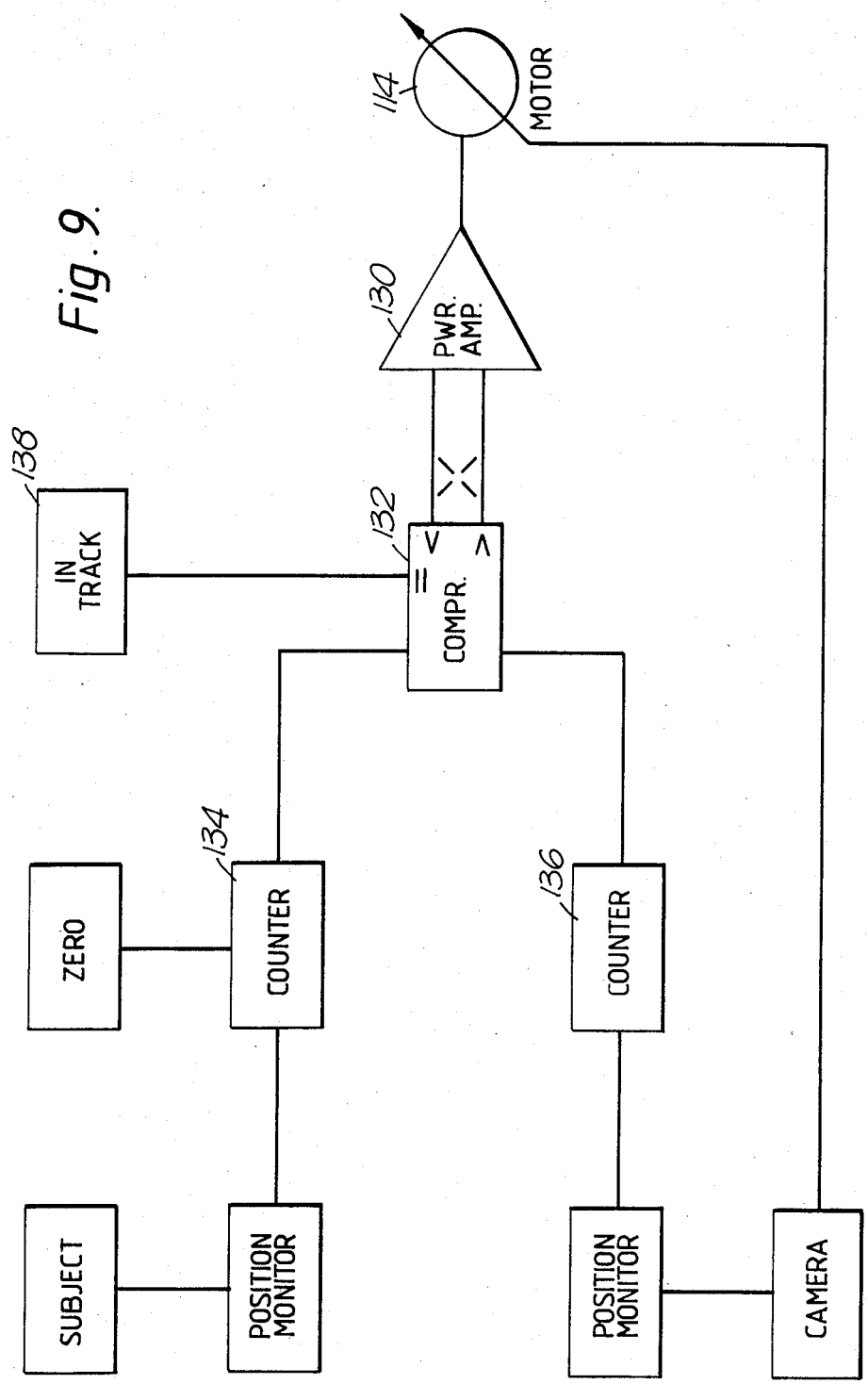

The energisation of the motor 114, which forms part of an electronic servo control system is controlled by electronic circuitry illustrated schematically, in block diagram form, in FIG. 9.

The motor 114 is a reversible D.C. motor energised by a circuit 130 the input to which is provided by the "greater than" and "less than" outputs of a digital comparator 132. The circuit 130 comprises a power amplifier and feedback circuitry, (not shown, but the purpose of which is explained below). For simplicity, the circuit 130 is hereinafter referred to as "the power amplifier 130". The inputs to the comparator 132 are provided by a counter 134 and a counter 136. When the counts in counters 134 and 136 are equal, the comparator applies zero input signal to amplifier 130 and also energises an indicator lamp 138 to indicate that the camera is "in track" with the subject.

The counter 134 counts the pulses provided by the displacement transducer associated with the subject, these pulses being received via the cable 112, whilst the counter 136 counts the pulses similarly provided by the displacement transducer associated with the camera mount 18 and transmitted via the cable 122.

Zero-resetting means for setting the respective counters to zero, are provided, only that associated with counter 134 being illustrated.

In use, as with the embodiment of FIGS. 1 to 4, the camera mounting assembly is set up with the path of movement of the camera mount along the bars 20 parallel with the path of movement of the subject vehicle, and with the subject vehicle displacement transducer fitted and connected, via the cable 112 with the circuitry of FIG. 9, (which is conveniently located, with the motor 114, in a casing secured to or incorporated in one of the blocks 22). The counters 134 and 136 are zeroed and the subject vehicle is moved forwards, as before, e.g. by towing by means of a fine cable. The pitch of the grids of the displacement transducers is preferably such that pulses are produced at intervals corresponding to comparatively small increments of displacement, e.g. one pulse per 0.3 mm of displacement.

Thus, almost as soon as the subject vehicle begins to move, the count in counter 134 will begin to increase, and a signal will appear at the "less than" output of the comparator 132 to energise the motor 114, via the amplifier 130 to move the camera mount 18 to follow the movement of the subject. The camera mount, and thus the camera is thus caused to catch up with the subject, the count in counter 136 thus rising until, when it equals the count in counter 134, the output of the comparator 132 is adjusted accordingly and the "in track" lamp 138 is illuminated to indicate to the photographer that the camera may be operated. The output of comparator 132 will, of course change at intervals throughout the traverse of the subject and the camera mount, but the control loop in the system incorporates critical damping to ensure that the output of the motor 114 does not fluctuate in such a manner as to cause camera judder.

Critical damping may be achieved by use of proportional plus integral feedback on the power amplifier 130 driving the motor. (For simplicity, the feed-back circuitry for effecting such feedback is not shown and may be regarded as incorporated in the "amplifier" 130). The effect of such proportional plus integral feedback will be to produce one slight overshoot in the camera position upon starting subject movement, and another when the camera stops. Between these points almost perfect tracking can be achieved, with a small lag in the order of 0.1 mm so that continuous movement of the subject will result in continuous movement of the camera, without judder.

Control means, (not shown) is provided, operable to reverse the direction of drive of the motor, for example, so that tracking of the subject vehicle in either of the two directions along the bars 20 can be achieved, or so that, after a complete tracking movement the mount 18 may be returned, in the opposite direction to its starting position.

In the latter case the circuitry is preferably so arranged that operation of a control to effect a non-tracking return movement effectively frees the motor from the influence of the counters, or so modifies the counts in one or other of the counters, or influences the supply of pulses to the counters, that the return movement is effected rapidly irrespective of any signals from the displacement transducers.

The system described with reference to FIGS. 5 to 9 has the advantage, over that of FIGS. 1 to 4, that, even when the distance between subject and camera is large, difficulties which may arise in the apparatus of FIGS. 1 to 4 as a result of friction, backlash and snatch in the mechanical connection (and more especially in the Bowden cable, and the camera mount), between the subject vehicle and the camera mount are eliminated or reduced. (Even where the displacement transducer associated with the subject vehicle is connected with that vehicle by means of a thin wire or the like, this wire does not need to transmit the force required to move the camera and mount but only the force required to move the sensor, which force can be made relatively small).

It will be appreciated that various different circuit arrangements may be used in embodiments in which a purely electrical or electronic link is provided between the subject and the camera mount.

Furthermore, of course, the cable link between the subject displacements transducer and the camera mount tracking control circuitry could, if desired, be replaced by a radio, ultrasonic or the like link via which the relevant information can be transmitted.

The displacement transducers may, of course, be of some other type, although to afford good accuracy with a wide range digital operation is preferred.

It will be appreciated that various modifications may be made to the apparatus described, within the scope of the appended claims.

We claim:

1. Apparatus for use in producing a photograph of a mobile subject such as a vehicle, comprising a support, a camera mount adapted to have a camera secured thereto, means mounting said camera mount for linear translational movement along said support in a predetermined direction, means for detecting linear displacement of a subject in said predetermined direction, and means for imparting linear displacement to the camera mount in said predetermined direction, along said support, in correspondence with a sensed displacement in said predetermined direction of the subject, wherein said means for detecting displacement of the subject includes a displacement transducer for producing an output signal indicative of the amount of the displacement of the subject relative to a fixed reference, means for receiving said signal and effecting a corresponding displacement of the camera mount along said support, the last-mentioned means including motor means for displacing the camera mount, and control means for receiving said signal and controlling said motor means to produce the appropriate displacement, said control means including a second displacement transducer for sensing movement of said camera mount along said support, and comparator means for comparing the displacements, sensed by said transducers, of the subject and the camera mount, and for controlling the energisation of said motor means in such a way as to tend to minimise differences in said displacements of the subject and the camera mount, each said displacement transducer comprising a first part, incorporating an optical grid, with a series of markings extending thereacross at regular intervals therealong, and a second part incorporating an electrical-optical sensor, and means mounting one of said parts for linear movement relative to the other to traverse the sensor along the grid to cross said markings in succession, to cause said sensor to produce a corresponding succession of electrical pulses, the apparatus including a respective counter, associated with each said sensor, for counting the signals produced thereby.

2. Apparatus for use with a camera to produce a photograph of a mobile subject, such as a vehicle, comprising a stationary support; means mounting the camera upon said support for linear translational movement of the camera along said support in a predetermined direction; means for detecting linear displacement of a subject in said predetermined direction, and means for linearly displacing the camera along said support in said predetermined direction, in correspondence with a sensed displacement in said predetermined direction of said subject, the camera being operable to make a single photographic exposure during, and extending over an appreciable part of, the linear displacement of the camera; wherein said means mounting the camera upon said support for linear translational movement includes a camera mount and means detachably securing the camera to said camera mount; said camera mount being itself mounted upon said support for such linear translational movement; said means for linearly displacing the camera being arranged to impart such movement to the camera via said camera mount; said means for detecting linear displacement of said subject including a displacement transducer for producing an output signal indicative of the amount of the displacement of said subject relative to a fixed reference, means for receiving said signal and effecting a corresponding displacement of said camera mount along said support, the last-mentioned means including motor means for displacing said camera mount, and control means for receiving said signal and controlling said motor means to produce the appropriate displacement, said control means including a second displacement transducer for sensing movement of said camera mount along said support, and comparator means for comparing the displacement sensed by said transducers of said subject and said camera mount, and for controlling the energisation of said motor means in such a way as to tend to minimize differences in the displacements of said subject and said camera mount; wherein each displacement transducer comprises a first part, incorporating an optical grid, with a series of markings extending thereacross at regular intervals therealong, and a second part incorporating an electrical-optical sensor, and means mounting one of said parts for linear movement relative to the other to traverse said sensor along said grid to cross said markings in succession, to cause the sensor to produce a corresponding succession of electrical pulses, the apparatus including a respective counter, associated with each said sensor, for counting the signals produced thereby.

* * * * *